Dec. 25, 1962     A. HANSEN, JR., ET AL     3,070,739
CONTROL SYSTEM FOR SOLID STATE CONTROLLED RECTIFIER
Filed May 23, 1960     3 Sheets-Sheet 1

Inventors:
Albert Hansen, Jr.,
Fred W. Kelley, Jr.,
Istvan Somos,
William H. Tobin, Jr.,
by Irving H. Marshman
Attorney.

Inventors:
Albert Hansen, Jr.,
Fred W. Kelley, Jr.,
Istvan Somos,
William H. Tobin, Jr.,
by *Irving H. Marshman*
Attorney.

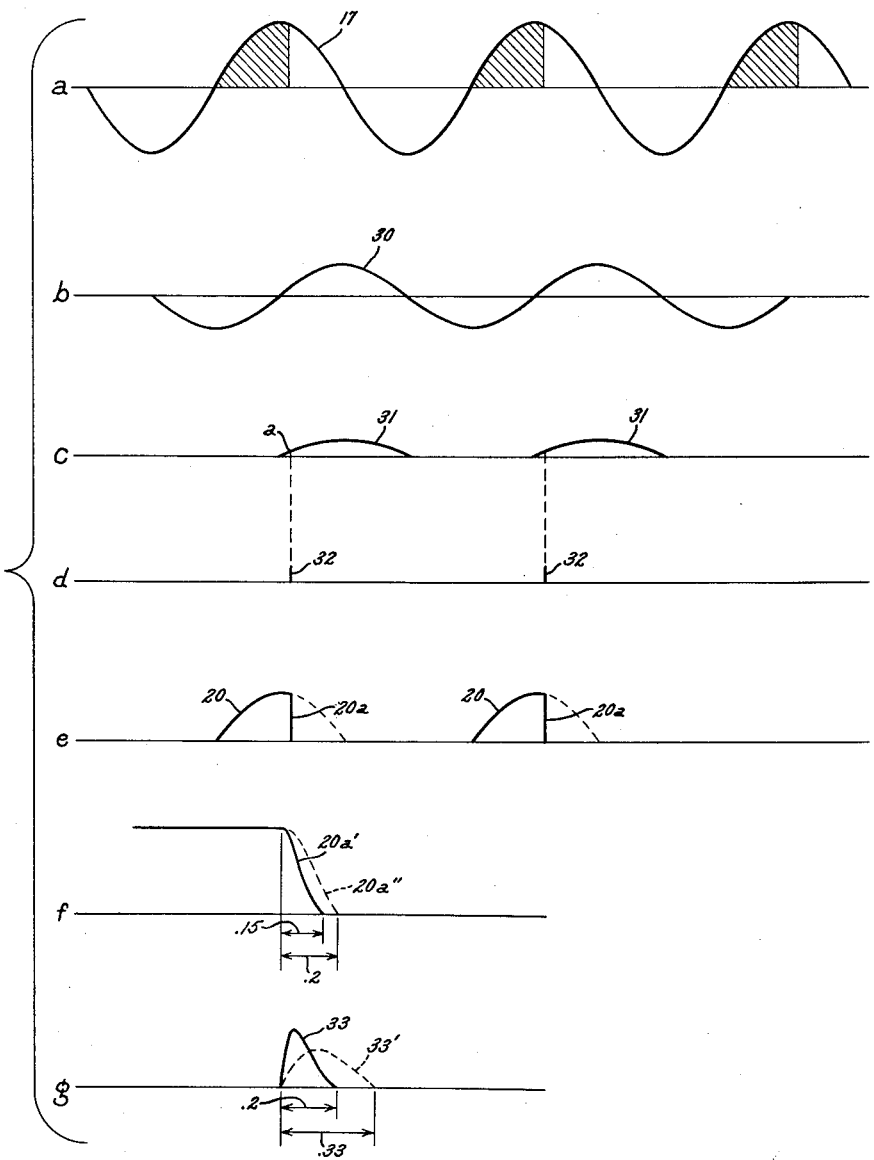
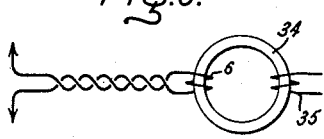

United States Patent Office 3,070,739
Patented Dec. 25, 1962

3,070,739
CONTROL SYSTEM FOR SOLID STATE
CONTROLLED RECTIFIER
Albert Hansen, Jr., Swarthmore, Fred W. Kelley, Jr., Media, Istvan Somos, Drexel Hill, and William H. Tobin, Jr., Media, Pa., assignors to General Electric Company, a corporation of New York
Filed May 23, 1960, Ser. No. 31,053
7 Claims. (Cl. 321—47)

This invention relates to control system, more particularly to systems for controlling the operation of solid state controlled rectifiers and it has for an object the provision of an efficient, sensitive, improved and inexpensive control system of this character.

More specifically the invention relates to control systems for solid state rectifiers such as silicon controlled rectifiers in which conduction through the device is initiated by a gate control electrode which thereafter loses control of conduction, and a further object of this invention is the provision of a highly sensitive control system for a controlled rectifier of this character.

A still further object of the invention is the provision of a greatly simplified control system for causing a solid state controlled rectifier to respond to extremely minute changes in inductance or capacitance of a sensing means.

Still another object of the invention is the provision of a control system of this character in which the number of parts is reduced to a minimum.

Another object of the invention is the provision of a control system for a solid state controlled rectifier that produces highly efficient performance and is highly reliable in operation.

In carrying the invention into effect in one form thereof the anode and cathode of a solid state controlled rectifier are connected to be supplied from a suitable source. A resistance-inductance-capacitance discharge circuit is provided for supplying one or more current pulses to the gate electrode of a controlled rectifier and means are provided for varying the duration time thereof in order to control turn-on and turn-off of the controlled rectifier.

For a better and more complete understanding of the invention reference should now be had to the following specification and to the accompanying drawings in which:

FIGS. 4, 5, 6 and 7 are charts of characteristic curves which serve to facilitate an understanding of the invention; and FIG. 8 is an illustration of a saturable reactance sensing device.

Figure 1:
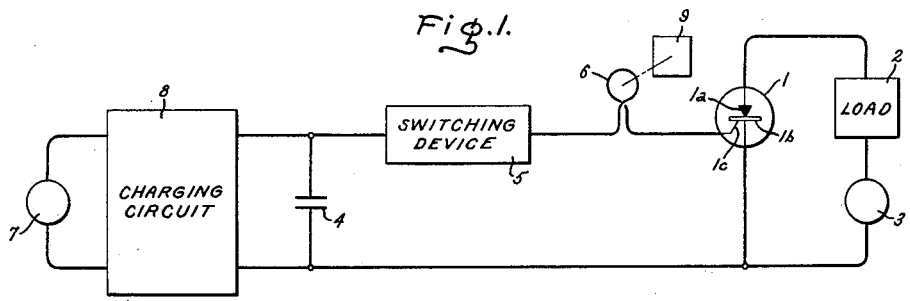
FIG. 1 is a simple diagrammatical sketch in block diagram form of an embodiment of the invention.

Referring now to the drawing, a controlled rectifier 1 which may be a silicon controlled rectifier is connected in circuit with a load 2 and a power supply 3. The rectifier 1 is a solid state device having an anode 1a, a cathode 1b and a gate controlled electrode 1c. The gate electrode controls conduction through the device in that it initiates conduction through the anode and cathode but thereafter loses control over such conduction until the anode cathode circuit current is interrupted and thereafter the gate control electrode regains control over initiation of conduction. A gate control circuit for the rectifier connected between its cathode and gate electrode comprises a capacitor 4, a switching device 5 and an inductance device 6 all connected in series relationship. The capacitor may be quite small. Means comprising a conventionally illustrated supply source 7 and a charging circuit 8 are provided for charging the capacitor 4. A charge is accumulated on the capacitor 4 owing to the charging current provided by the power supply 7 and charging circuit 8. In order that the charging circuit may not, itself, directly fire the controlled rectifier, it is made ineffective by means such as an impedance in the charging circuit for limiting the charging current to a value less than the critical value of gate circuit current required to fire the rectifier. This result may also be achieved by other means such as synchronizing the flow of the charging current with the operation of the switching device 5 such that the magnitude of charging current available during the interval in which the switching device is closed is less than the critical value of gate current required to fire the controlled rectifier.

Operating the switching device to the switched closed condition results in discharge of the previously charged capacitor 4 through the inductance device 6 and gate circuit of the rectifier. Thus the gate circuit is a resistance-capacitance-inductance discharge circuit. If the inductance of inductance device 6 is large in comparison with that of the leads, a change in the inductance of device 6 or short circuiting its inductance by placing in its proximity a suitable device such as a conductive shield or a short circuited turn 9 will very considerably influence the nature of the discharge current if the effective change in inductance is sufficient to engender a change from a very under-damped discharge to an over-damped discharge. With the capacitance 4, the inductance 6 and the distributed inductance in the discharge circuit leads properly selected and related, and if the inductance of device 6 has not been rendered ineffective, i.e., short circuited, the controlled rectifier 1 is fired or "turned on" when the switching device 5 is closed. On the other hand when a suitable means such as a conductive shield or shorted turn is placed in proximity to the inductor 6, the controlled rectifier 1 is prevented from firing or is "turned off" even though the switching device 5 is maintained closed.

The physical dimensions of the inductance device 6 are not critical; the device may consist of one or a plurality of turns encompassing an area of more than 100 square inches for use in cooperation with a relatively large conductive shield 9 or equivalent element such as a shorted turn, or it may consist of a few turns encompassing an area of one square centimeter for the purpose of responding to the proximity effect of a conductive shield or a shorted turn enclosing a comparable relatively small area.

Figure 4:
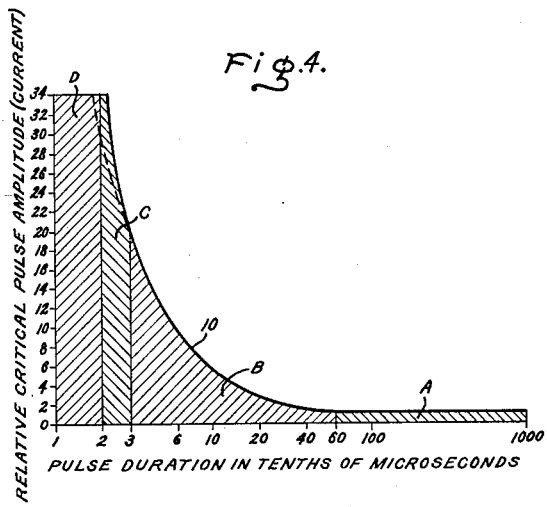
Figure 5:
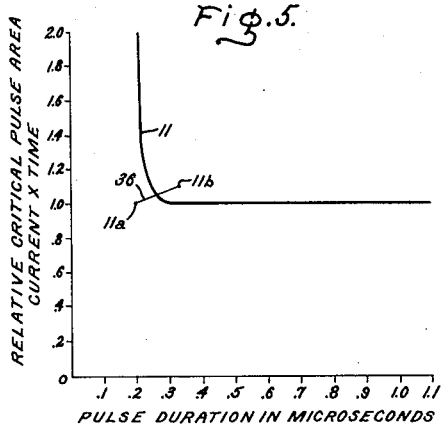

For the purpose of firing a controlled rectifier under controlled conditions there is a critical value of D.-C. gate current. By controlled conditions it is implied that temperature, anode voltage and load resistance do not vary and are suitably chosen. The firing current may consist of one or more pulses varying in duration from a few microseconds to direct current. Although there may be considerable variation in the pulse duration firing characteristics of individual rectifiers they are generally similar as illustrated in FIG. 4 by the curve 10 which is a graphical representation of the relationship between firing pulse duration and critical firing amplitude for a controlled rectifier that may be regarded as typically representative. This curve is known as the critical firing pulse amplitude curve. Abscissae of this curve represent pulse duration in tenths of microseconds plotted on a logarithmic scale and ordinates represents the amplitude of the pulses required to fire the controlled rectifier, plotted on a linear scale. Since the actual values of critical amplitude vary from one rectifier to another, the pulse amplitude required to fire the rectifier is plotted merely on a relative scale so that the curve 10 will generally be applicable to different rectifiers. Gate current less than the critical value will not result in firing; gate current equal to or greater than the critical value causes firing. In the region of the characteristic which encompasses pulse durations varying from 6 microseconds to direct current, the amplitude of pulses required to fire the controlled rectifier is constant and is therefore independent of pulse duration. This region is indicated by the shaded area A in FIG. 4. For current pulses of durations within the range of approximately .3 microsecond to 6 microseconds, the critical amplitude of the pulse increases as the pulse duration is shortened. This region is indicated by the shaded area B. Within this region the product of critical amplitude and pulse duration is a constant. In the region of pulse durations between .2 microsecond and .3 microsecond represented by the shaded area C the critical pulse amplitude is in excess of that predicted by projection of that portion of the characteristic curve 10 which lies in the .3 to 6 microsecond region and such excess increases as the pulse duration is shortened. In this connection, the projected prediction is indicated by a dashed line in area C. For pulses of less than .2 microsecond duration the controlled rectifier is not fired by pulses having any realistic (e.g., 100 times normal) amplitude. This region is represented by the shaded area D. In FIG. 5, curve 11 is a graphical representation of the relationship between pulse duration and critical pulse area (critical amplitude duration) for the region of curve 10 between 0 and 1.1 microseconds. Inspection of curve 11 reveals that although a .2 microsecond pulse having 2 relative units of pulse area will not cause firing, the same area pulse distributed over .3 microsecond clearly will cause firing. Actually, as shown by curve 11 a 2-unit area pulse distributed over .21 microsecond would result in firing the controlled rectifier. In other words, a 0.1 microsecond change in duration of the pulse involving a redistribution of its area represents the difference between not firing and firing, thus illustrating the extreme sensitivity of the circuit when pulse area and duration are carefully chosen.

Figure 6:
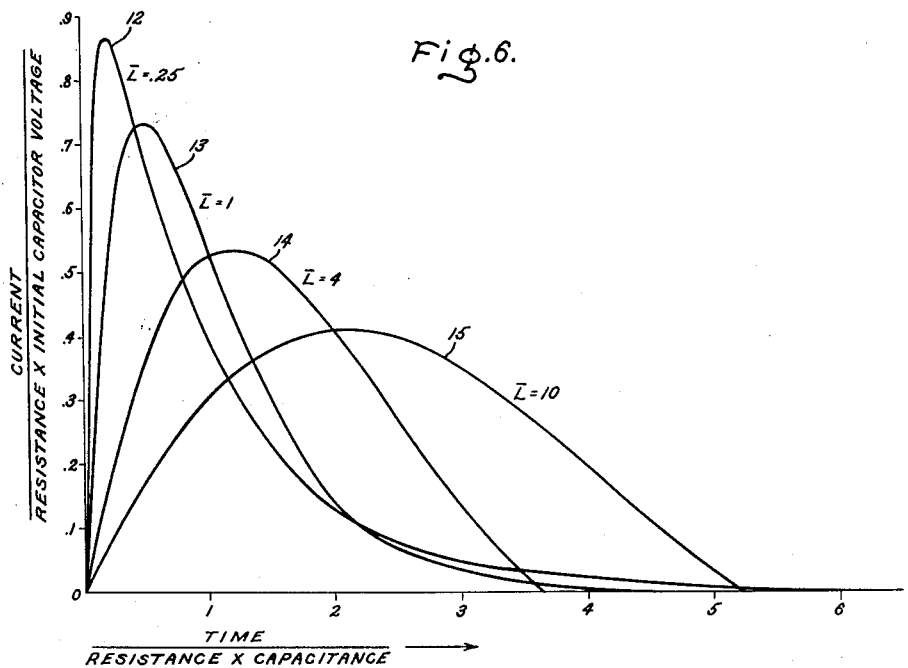

The effect of variation of the inductance 6 of FIG. 1 on the amplitude and area of the current pulses supplied to the gate of the controlled rectifier 1 is illustrated by the curves 12, 13, 14 and 15 of FIG. 6 for several values of inductance. These curves illustrate the discharge circuit current pulses as functions of time with parameters illustrated in normalized or per-unit terms. Curve 13 represents the case for critical damping, i.e., $\overline{L}=1$ wherein $$\overline{L} = \frac{4L}{R^2C}$$

in which:

L is the inductance of the discharge circuit;
R is the resistance of the discharge circuit; and
C is the capacitance of the discharge circuit.

If $\overline{L}$ is less than 1 the circuit is over-damped and if greater than 1 it is under-damped or oscillatory. In the under-damped cases, only the portion of the discharge current associated with forward gate current is illustrated. As seen in FIG. 6, as $\overline{L}$ is increased over the region from $\overline{L}=1$ to $\overline{L}=10$ the effective pulse area is also increased. It is also seen that by increasing the inductance of the discharge circuit, the effective duration of the pulses is increased. By employing discharge pulses of the character illustrated in FIG. 6 particularly in the range between curves 13 and 15 with a duration in the region of .25 microsecond and with the pulse area suitably adjusted by the capacitor charge, only a very small change in inductance or in capacitance of the discharge circuit is required to cause firing or to prevent firing when the switching device 5 is closed. When the rectifier is fired it is said to be "turned on" and when it is prevented from firing it is said to be "turned off."

From the characteristics illustrated in FIG. 6 it is seen that the utility of the invention is not limited to the .25 microsecond pulse duration region. However, in this region the sensitivity and reliability of operation are high and therefore advantageous, particularly in the presence of conditions such as temperatures that are not closely controlled.

Figure 2:
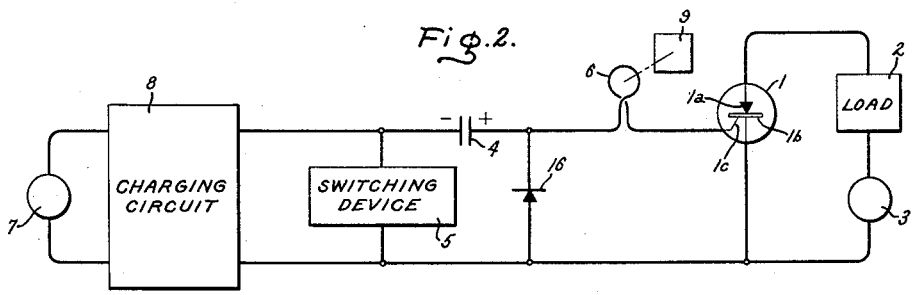
FIG. 2 is a conventional block diagram of a modification.

The modification illustrated in FIG. 2 is generally similar to the embodiment illustrated in FIG. 1 and differs from it primarily in that a rectifier diode 16 is connected in series between the charging circuit 8 and the capacitor 4, and the switching device 5 is connected in parallel with this series combination. The diode 16 is poled so that the capacitor charge is of proper polarity for supplying "firing current" to the gate element of controlled rectifier 1. The supply 7 may be poled so that the charging of capacitor 4 through diode 16 occurs during the interval of positive anode voltage for controlled rectifier 1 or during the interval of negative anode voltage for controlled rectifier 1 if supplies 3 and 7 are alternating. Preferably, the charging current supply 7 and charging circuit 8 are designed to be rather "soft"; i.e., they are designed to exhibit relatively high resistance so that when the output of the charging circuit is short circuited by the switching device 5, the voltage of the supply will be absorbed in the resistance leads and the charging current will be of relatively low magnitude, thereby averting damage to the switching device.

During the charging period the capacitor 4 is charged to the polarity illustrated in FIG. 2. However, current does not flow in the gate circuit of the controlled rectifier during this period because the switching device is in the switch open position. The operation is generally the same as that described for the embodiment illustrated in FIG. 1 and will be readily understood from the above description of the operation of FIG. 1.

Figure 3:
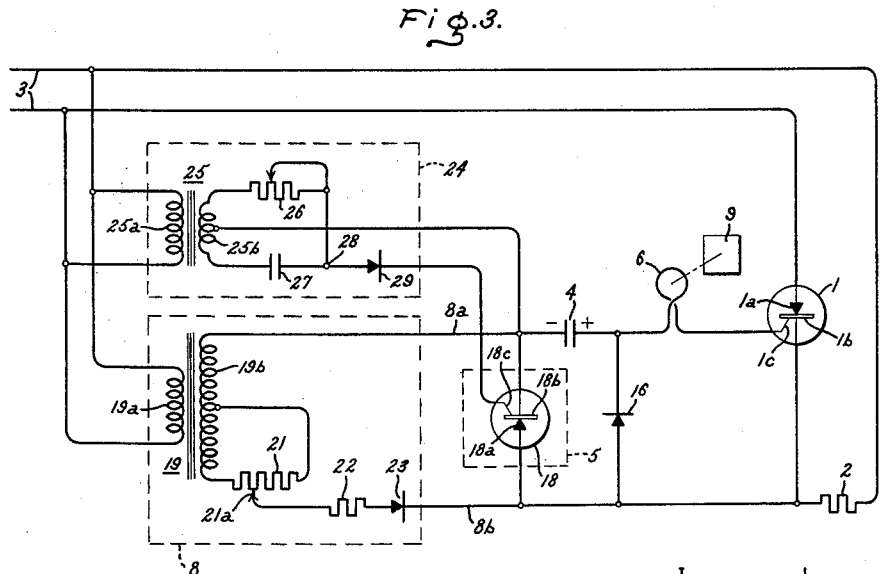
FIG. 3 is an elementary diagram of a further modification of the invention.

The modification illustrated in FIG. 3 is generally similar to the modifications illustrated in FIGS. 1 and 2 and accordingly, in these three figures, the same reference characters are applied to corresponding elements. The load 2 in the anode cathode circuit of controlled rectifier 1 may be a resistance load as shown or it may include a certain amount of reactance. The source 3 is illustrated as an alternating voltage source of suitable frequency such as the conventional commercial frequency of 60 cycles. Thus the voltage supplied from the source to the anode of controlled rectifier 1 is represented by the sinusoidal voltage wave 17 in FIG. 7. Constituting the switching device 5 is a solid state controlled rectifier 18 having its anode cathode circuit connected across the charging circuit output conductors 8a and 8b and also connected in series in the discharge circuit which constitutes the gate circuit of controlled rectifier 1. As shown, the anode 18a is connected to the charging circuit conductor 8b and also to the cathode 1b of controlled rectifier 1 whereas the cathode 18b is connected to the charging circuit conductor 8a and to the negative terminal of capacitor 4.

A transformer 19 having its primary winding 19a connected to the source 3 supplies a voltage to the charging circuit 8 that is in phase with the anode voltage of controlled rectifier 1. This voltage is graphically represented in FIG. 7 (location e) by the sinusoidal voltage wave 20. For the purpose of adjusting the magnitude of the charging voltage to a suitable value, a potentiometer 21 is connected between an intermediate tap and one terminal of secondary winding 19b and the charging circuit conductor 8b is connected to slider 21a on the potentiometer through a resistor 22 and a diode rectifier 23.

For the purpose of causing the inductance-capacitance discharge circuit to supply firing pulses to the gate circuit of main controlled rectifier 1 during positive half cycles of its anode voltage, a synchronous firing circuit 24 is provided for supplying firing current pulses to the gate electrode 18c of switching device controlled rectifier 18 in synchronism with the anode voltage of controlled rectifier 1. As shown in FIG. 3, firing circuit 24 comprises a transformer 25 having a primary winding 25a that is supplied from the source 3 which supplies the main controlled rectifier 1. Alternatively, the primary winding 25a may be supplied from a separate source synchronized with source 3. The two end terminals of secondary winding 25b are connected through adjustable resistor 26 and a capacitor 27 respectively, to a common terminal 28 and thence through diode rectifier 29 to the gate electrode 18c of the switching device controlled rectifier 18 of which the cathode 18b is returned to the midtap of secondary winding 25b. As a result of this connection, there is supplied to the gate electrode 18c an alternating voltage that is represented in FIG. 7 (location b) by the sinusoidal voltage wave 30. The phase relationship of this voltage with respect to the voltage supplied to the anodes 1a and 18a may be adjusted over a substantial range by adjusting resistor 26 which, together with capacitor 27, constitutes a phase shifting network.

For varying the inductance of the discharge circuit to effect "turn on" or "turn off" of the controlled rectifier 1, a conductive shield made of a suitable conducting material such as copper or aluminum is suitably mounted for relative movement with respect to coil 6. For example, it may be mounted on the needle element of an indicating instrument, or it may be mounted on any movable element, the position of which is to be used to control the firing of controlled rectifier 1. It can be mounted for movement in a plane parallel to the plane of coil 6 or it can be mounted in a plane parallel to the plane of the coil for movement along the coil axis in a direction transverse to the parallel planes, i.e., to increase or to decrease the separation of the planes of the coil and the shield.

For maximum sensitivity, the resistance, capacity and inductance of the discharge circuit are chosen to produce discharge current pulses in the range of .2 to .3 microsecond duration when the inductance of the coil 6 is minimized by the proximity of the conductive shield 9 or other means. In the following description of an actual operation of the system of FIG. 3, it is assumed that the electrical parameters are so chosen that the discharge circuit is slightly under-damped ($\bar{L}=2$) and that under the condition of minimum inductance of the inductance coil 6 the pulse duration will be .2 microsecond and the pulse will have an amplitude corresponding to an ordinate value of 30 on the relative critical pulse amplitude current scale of FIG. 4. This point corresponds to point 11a in FIG. 5. It is also assumed that the conductive shield 9 is initially in the proximity position with respect to coil 6 that causes it to exhibit minimum inductance. When the gate circuit voltage of controlled rectifier 18 (as represented by the curve 30) becomes positive in each cycle of the supply, firing current pulses flow in the gate circuit of controlled rectifier 18. These pulses are represented in FIG. 7 (location c) by the discontinuous curve 31. At a predetermined critical value a of each of such gate current pulses, controlled rectifier 18 fires. A plurality of such firing events are represented in FIG. 7 (location d) by short vertical lines 32. During each positive cycle of the supply, capacitor 4 is charged and at a point in each positive half cycle corresponding to the firing event 32 it is discharged as represented by the vertical portions 20a of the capacitor voltage wave curve in FIG. 7. Since a capacitor cannot discharge instantaneously, the portions 20a are not absolutely vertical but, as shown in FIG. 7 (location f), on an enlarged time scale, they are curves involving an exponential decay as represented by the solid line portion 20a'. The time required for the discharge is .15 microsecond; in this connection it was assumed that the components of the discharge circuit were dimensioned to supply gate current pulses of .2 microsecond duration as represented in FIG. 7 (location g) by the full line pulse 33. As will be seen both from the critical amplitude firing curve 10 in FIG. 4 and the critical pulse area firing curve 11 in FIG. 5 the controlled rectifier 1 will not be fired by a gate current pulse having a duration of .2 microsecond and a relative amplitude of 30. However, a small relative movement of the conducting shield 9 and inductance coil 6, e.g. a relative movement of 1 centimeter will cause the coil 6 to exhibit an increased inductance which will lengthen the discharge time of the capacitor 4; e.g., it may be assumed that it will lengthen it to .2 microsecond as represented by dashed line 20a', FIG. 7 (location f). Correspondingly, the firing current pulses supplied to the gate of controlled rectifier 1 will have a lengthened duration of .33 microsecond as represented by the dashed line 33' in FIG. 7 (location g). The lengthened pulse 33', although of lower amplitude, has greater area than the unlengthened pulse 33. Actually, the area of pulse 33' is approximately 10% greater and is represented by the point 11b in FIG. 5. Consequently, as seen from the critical pulse area curve 11 (FIG. 5) the area of the modified pulse will be very considerably greater than the critical value for a .33 microsecond duration pulse and consequently, the controlled rectifier 1 will fire.

The high sensitivity of the circuit is illustrated by the relative positions of the points 11a and 11b in FIG. 5. Point 11a represents a pulse having 1 relative unit of area and a duration of .2 microsecond. As shown by curve 11 a solid state controlled rectifier cannot be fired by a pulse of less than .2 microsecond duration for any realistic value of relative area. The point 11b represents a pulse of .33 microsecond duration and having 1.1 relative units of area which, for a pulse of this duration is much greater (approximately 10%) than the critical relative value required to fire the rectifier. Thus, for 1 centimeter relative movement of coil 9 and shield 6, the areas of the pulses supplied to the gate electrode 1c are changed from a value far less than any realistic value at which the rectifier can be fired by a .2 microsecond pulse to a value substantially greater than the critical value required to enable a .33 second pulse to fire the rectifier. Actually, as shown by line 36, joining points 11a and 11b, far less than 1 centimeter relative movement of the coil and shield is required to effect turn on or turn off of the controlled rectifier. For increasing values of pulse duration and decreasing displacement of the coil and shield the points 11a and 11b move along the line 36 toward the curve 11. As these points, which represent conditions with (1) the shield in close proximity and (2) shield slightly removed, approach the critical value defined by the intersection of line 36 and curve 11, the sensitivity, i.e., the movement of the shield required to cause firing or prevent firing become extremely small compared to the 1 centimeter displacement to change from a pulse represented by point 11a to one represented by point 11b.

As long as the relative displacement of conductive shield 9 and inductance coil 6 is at least equal to the value that caused rectifier 1 to fire, it will continue to fire in each half cycle of the supply in which the discharge circuit is completed by the switching device controlled rectifier 18. Return of the conductive shield 9 and coil 6 to their minimum inductance relative positions will prevent the controlled rectifier from firing. Thus an extremely small relative movement of conductive shield 9 and inductance coil 6 will cause firing when the switching device 5 is closed or prevent firing when the switch is closed; in other words, a small relative displacement represents a difference between firing and not firing.

The inductance coil 6 in the modifications of FIGS. 1, 2 and 3 may be replaced by any other suitable sensing device, such, for example, as the saturable reactance device illustrated in FIG. 8. This device comprises a ferromagnetic core member 34 made of a suitable magnetically saturable material such as ferrite. The inductance winding 6 is wound on the core and connected in the capacitor discharge circuit in the same manner in which the correspondingly numbered inductance coil 6 is connected in the discharge circuits of FIGS. 1, 2 and 3. Also wound on the core 34 is a saturation control winding 35 which is supplied with direct current that may be suitably adjusted over a range of values. Each of the windings 6 and 35 may consist of one or a few turns.

In operation, supplying a direct current to the winding 35 has the same effect as is produced by moving a conductive shield into close proximity to the air core inductor 6 illustrated in FIGS. 1, 2 and 3; that is to say a predetermined amount of D.-C. current in the saturation control winding prevents the controlled rectifier from firing when the switching device is in circuit closed position and permits the controlled rectifier to fire when the D.-C. current is reduced very slightly or is made zero.

Persons skilled in the art will understand that the effects that are produced by varying the inductance reactance of the inductance device 6 may also be produced by varying the capacitance of capacitor 4.

Although in accordance with the provisions of the patent statutes a physical embodiment of the invention has been illustrated and described. It will be understood that the apparatus shown in the drawing and described in the specification is merely illustrative and that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. In combination, a solid state controlled rectifier of the type having an anode, a cathode and a gate electrode wherein conduction through the rectifier is initiated by said gate electrode which thereafter loses control over conduction through the rectifier, a gate control circuit connected to said gate electrode and to said cathode including a capacitance and an inductance, a charging circuit for applying a direct voltage charge to said capacitance, means for causing a current pulse to flow in said gate control circuit comprising a switching device for closing said gate control circuit to initiate discharge of said capacitor and means for controlling the turn on of said controlled rectifier comprising means for varying the reactance of said circuit to vary the duration time of said pulse.

2. In combination, a controlled rectifier having an anode, a cathode and a gate electrode, means for supplying a voltage to said anode and cathode, a gate control circuit connected to said gate electrode and to said cathode including a capacitance and an inductance, means for charging said capacitance, means for causing pulses of current to flow in said gate circuit comprising a switching device for periodically opening and closing said circuit to effect periodic discharge of said capacitor, and means for controlling the turn on and turn off of said controlled rectifier comprising means for varying the reactance of said circuit to vary the time duration of said pulses.

3. In combination, a controlled rectifier having an anode, a cathode and a gate electrode, means for supplying a voltage to said anode and cathode, a gate control circuit connected to said gate electrode and cathode including a component comprising a capacitance and a second component comprising an inductance, a charging circuit for said capacitance comprising a source of periodically varying voltage and electrical connections therefrom to said capacitance, means for causing pulses of current to flow in said gate circuit comprising a switching device synchronized with said source for periodically opening and closing said gate circuit to effect periodic discharge of said capacitance and means for effecting turn on of said controlled rectifier in response to said pulses comprising means for varying one of said circuit components.

4. In combination a solid state unidirectional conducting device of the type having an anode, a cathode and gate electrode wherein conduction through the device is initiated by said gate electrode which thereafter loses control over conduction through the device, means for supplying voltages to said anode and cathode, a gate control circuit connected to said gate electrode and said cathode including a capacitance and an inductance, a charging circuit for said capacitance comprising a voltage supply source and electrical connections therefrom to said capacitance, means for causing to flow in said gate circuit current pulses having a duration time determined by the inductance, capacitance and resistance thereof, comprising a switching device for periodically opening and closing said gate circuit to effect periodic discharge of said capacitance, and means for selectively effecting or preventing turn on of said unilateral conducting device comprising means for varying said inductance to vary the duration time of each of said pulses to values greater or less than the critical pulse time duration required to initiate conduction in said unilateral conducting device.

5. In combination, a solid state controlled rectifier of the type having an anode, a cathode and a gate electrode wherein conduction through the rectifier is initiated by current pulses having a duration time in excess of a predetermined critical value supplied to said gate electrode which thereafter loses control over conduction through the rectifier, a periodic voltage supply for said anode and cathode, a gate control circuit connected to said gate electrode and said cathode including a capacitor and an inductance device, a charging circuit for said capacitor, means for causing current pulses to flow in said gate circuit to initiate conduction in said controlled rectifier at predetermined firing points in positive half cycles of the periodic voltage supplied to said anode comprising a switching device synchronized with said periodic voltage supply to effect periodic discharge of said capacitor, and means for selectively effecting or preventing turn on of said controlled rectifier at said predetermined firing points comprising means for varying the inductance of said inductance device to vary the duration time of said current pulses to values greater or less than said critical value.

6. In combination a solid state controlled rectifier of the type having an anode, a cathode and a gate electrode wherein conduction through the rectifier is initiated by current pulses having a duration time in excess of a predetermined critical value supplied to said gate electrode which thereafter loses control over conduction through the rectifier, a periodic voltage supply for said anode and cathode, a gate control circuit connected to said gate electrode and said cathode including a capacitor and an inductance device, a charging circuit for said capacitor, means for causing current pulses to flow in said gate circuit to initiate conduction in said controlled rectifier at predetermined firing points in positive half cycles of the periodic voltage supplied to said anode comprising a second solid state controlled rectifier having a firing circuit synchronized with said periodic voltage supply to effect periodic discharge of said capacitor and means for selectively effecting turn on or turn off of said first controlled rectifier at said predetermined firing points comprising means for varying said inductance to vary the duration time of said current pulses to values within a predetermined range that includes values greater and less than said critical value.

7. In combination a solid state controlled rectifier of the type having an anode, a cathode and a gate electrode wherein conduction through the rectifier is initiated by current pulses having a time duration in excess of a predetermined critical value supplied to said gate electrode which thereafter loses control over conduction through the rectifier, a periodic voltage supply for said anode and cathode, a gate control circuit connected to said gate electrode and said cathode including a capacitor and an inductance device, a charging circuit for said capacitor, means for causing current pulses to flow in said gate circuit to initiate conduction in said controlled rectifier at predetermined firing points in positive half cycles of the periodic voltage supplied to said anode comprising a switching device synchronized with said periodic voltage supply to effect periodic discharge of said capacitor and to render said charging circuit inactive during each discharge of said capacitor, and means for selectively effecting or preventing turn on of said controlled rectifier at said predetermined firing points comprising means for varying said inductance to vary the duration time of said current pulses to values within a range that includes values greater and less than said critical value.

References Cited in the file of this patent

UNITED STATES PATENTS

| | | |
|---|---|---|
| 2,859,399 | Sommeria | Nov. 4, 1958 |
| 2,920,240 | Macklem | Jan. 5, 1960 |
| 2,925,546 | Berman | Feb. 16, 1960 |